United States Patent [19]
Callahan

[11] Patent Number: 4,931,916
[45] Date of Patent: Jun. 5, 1990

[54] APPARATUS FOR MECHANICALLY ADJUSTING LIGHTING FIXTURE BEAM AZIMUTH AND ELEVATION

[76] Inventor: Michael Callahan, 40 W. 94th St., New York, N.Y. 10025

[21] Appl. No.: 229,581

[22] Filed: Aug. 8, 1988

Related U.S. Application Data

[63] Continuation-in-part of Ser. No. 940,934, Dec. 12, 1986, Pat. No. 4,769,743, which is a continuation-in-part of Ser. No. 750,873, Jul. 1, 1985, Pat. No. 4,697,227.

[51] Int. Cl.[5] .............................................. G03B 15/02

[52] U.S. Cl. .................................... 362/272; 362/284; 362/296; 362/428

[58] Field of Search ............... 362/268, 269, 272, 277, 362/284, 285, 286, 287, 296, 304, 428; 315/312, 313, 321

[56] References Cited

U.S. PATENT DOCUMENTS

| | | | |
|---|---|---|---|
| 1,403,876 | 1/1922 | Sperry . | |
| 2,054,224 | 9/1936 | Levy . | |
| 3,139,604 | 6/1964 | Meiners et al. | 362/284 |
| 3,594,566 | 7/1971 | Kneisley | 362/268 |
| 4,460,943 | 7/1984 | Callahan | 362/276 |
| 4,527,198 | 7/1985 | Callahan | 362/285 |
| 4,663,698 | 5/1987 | Tomlinson | 362/284 |
| 4,729,071 | 3/1988 | Solomon | 362/35 |
| 4,769,743 | 9/1988 | Callahan | 362/272 |

OTHER PUBLICATIONS

Kneisley Electric Company, "Super Spot" data sheet No. 250, Printed 2/25/70.

Christie Electric Corporation, "HAL" print advertisement as published 6/79.

WelinLite (R.O.C.) fixture print advertisement as published 6/89.

*Primary Examiner*—David A. Okonsky
*Attorney, Agent, or Firm*—Kenyon & Kenyon

[57] ABSTRACT

A light projector, suitable for entertainment lighting and comprising a light source and associated light collecting means producing an elongated beam having an optical centerline that is preferably substantially horizontal, is provided with a means, typically a mirror, mounted to a first support adapted for rotation about an axis coincident with that centerline, for redirecting the beam through a first plane perpendicular to that substantially horizontal axis and centerline. A second mirror is rotatably mounted to the first support so that the redirected beam falls upon it, redirecting the beam a second time, through a second plane perpendicular to the centerline of the beam in the region between the first and second mirrors; a second plane that is also substantially parallel to the axis of rotation of the first support. The first support is supported for rotation about said axis on both sides of the means for redirecting.

21 Claims, 11 Drawing Sheets

Fig. 6B.
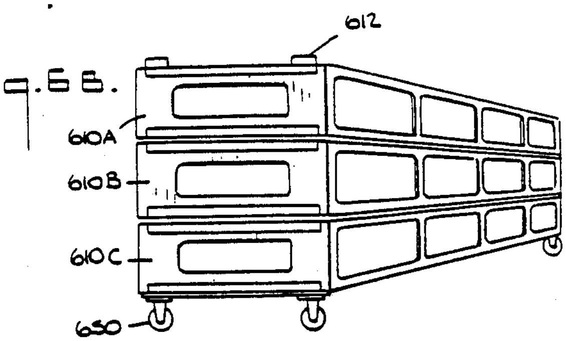
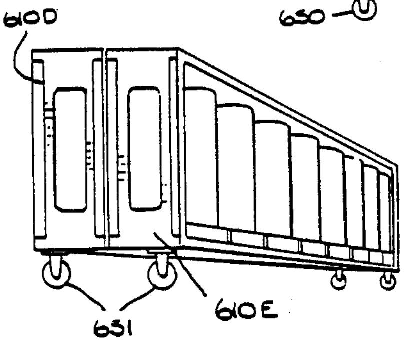
Fig. 6C.
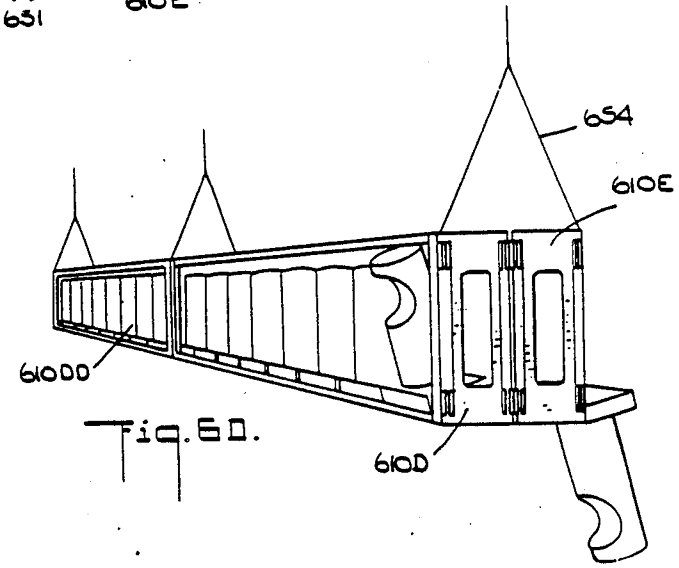
Fig. 6D.

APPARATUS FOR MECHANICALLY ADJUSTING LIGHTING FIXTURE BEAM AZIMUTH AND ELEVATION

It represents a continuation-in-part of application Ser. No. 940,934, filed Dec. 12, 1986, now U.S. Pat. No. 4,769,743, itself a continuation-in-part of application Ser. No. 750,873, filed July 1, 1985, now U.S. Pat. No. 4,697,227.

This application relates to entertainment lighting and, more specifically, to an improved apparatus and method for mechanically adjusting beam azimuth and elevation.

BACKGROUND OF THE INVENTION

Virtually all of the fixtures used to light stage shows, concerts, discotheques, films, and television productions produce light beams of directional character, beams whose azimuth and elevation relative to the structure supporting the fixture must be adjusted in order to illuminate the desired subject. In almost every case, the elevation adjustment capability is provided by suspending the fixture housing in the opening of a fork-like yoke or frame. The required azimuth adjustment capability is provided by rotatably mounting the yoke to the supporting structure. The fixture housing is manually rotated in each axis and locked in place by friction at the pivots as disclosed, for example, in U.S. Pat. No. 1,977,883.

This method of adjustment is simple and inexpensive, but it has the disadvantage that the maximum azimuth adjustment on either side of a plane perpendicular to the long axis of a common support, for any given fixture length greater than the fixture width, is inversely related to the spacing between the fixture and an adjacent fixture or obstruction. This requires that the spacing between adjacent elongated fixtures on a common support be increased in order to provide adequate clearance for azimuth adjustment, with the undesirable effect of thus decreasing the number of fixtures which can be accommodated on a given support.

Those fixtures which allow remote adjustment of azimuth and elevation generally employ this method with the addition of motors at the pivots, for example, as disclosed in U.S. Pat. No. 1,680,685.

This method of remote azimuth and elevation adjustment has several important disadvantages. One is that the entire mass of both the fixture and its yoke must be suspended from the azimuth pivot, and a motor and drive system must be provided having sufficient torque to accelerate this mass to motion and then smoothly decelerate it to a stop at the required position with the contradictory objects of both maximum speed and accuracy. The azimuth pivot must further maintain a high degree of stiffness so as not to introduce undesirable motion or error into positioning while minimizing friction, requiring the use of expensive bearings. Further, the very length of the fixture housing increases the problem of inertia presented by its moving mass. Also, changes in the design of the fixture which increase its length, or weight, or change its center-of-gravity can have such impact on the requirements for the azimuth actuator that major changes in the actuator and/or drive may be required. One such change is the addition of a motorized color changer mounted to the front of the fixture. Finally, most productions demand far more azimuth adjustment of a fixture than elevation adjustment, placing the highest workload on the weakest link in the system.

Alternatively, U.S. Pat. Nos. 1,747,279 and 4,112,486 employ an inverted "L" half-yoke. To all of the disadvantages of the more conventional full yoke must be added the complications of the eccentric loading of both the yoke itself and of the azimuth pivot.

Alternatively, some fixtures have been built with the use of a mirror rotatable in two axes as the method of adjusting azimuth and elevation, a remotely adjustable version disclosed in U.S. Pat. No. 2,054,224. While the motorization of such a fixture is far simpler because of the minimal mass of the mirror, this approach sets severe and generally unacceptable limits on adjustability, for while the azimuth adjustment of such a system is unrestricted, elevation adjustment is limited to within a narrow range on either side of a plane perpendicular to the elongated axis of the fixture housing. Adjustment towards the fixture results in obstruction of the beam by the fixture housing itself, while adjustment away from it results in clipping of the beam as it elongates beyond the edges of the mirror.

Alternatively, U.S. Pat. Nos. 4,663,698 and 4,729,071 disclose fixtures employing at least two mirrors for beam azimuth and elevation adjustment. In such systems, the fixture beam is directed downward towards a first mirror which is carried on a first support rotatable relative to the fixture housing about a vertical axis. This first support carries a second support with a mirror which is rotatable relative to the first support about a horizontal axis. The light beam is relayed from mirror to mirror, and the rotation of the two supports provides for adjustment of the beam in two axes.

Such systems have many practical disadvantages. In the case of the system disclosed in U.S. Pat. No. 4,663,698, such disadvantages include the height and width of the mirror system; the offset mounting of the second support, which produces a moment arm requiring greater effort to accelerate and decelerate under positive control; and the eccentric loading of the rotational couplings between the first support and the fixture and between the first support and the second support, which complicates their design and actuation - particularly given the requirements for both low friction and a high degree of stiffness while affording a large and unobstructed opening through the center for passage of the light beam.

The system disclosed in U.S. Pat. No. 4,663,698 adds a third and fourth mirror to bring the mirror responsible for elevation adjustment into alignment with the vertical axis of rotation. The system, however, suffers from many of the same disadvantages, plus those of its lengthened optical path.

Both systems place the highest workload—the pan or azimuth adjustment—on the portion of the system required to move the most mass.

It is the object of the present invention to disclose an improved apparatus for adjusting beam azimuth and elevation having none of the disadvantages of prior art methods.

SUMMARY OF THE INVENTION

A light projector, suitable for entertainment lighting and comprising a light source and associated light collecting means producing an elongated beam having an optical centerline that is substantially horizontal, is provided with a means, typically a mirror, mounted to a first support adapted for rotation about an axis coincident with that centerline, for redirecting the beam through a first plane perpendicular to that substantially horizontal axis and centerline.

A second mirror is rotatably mounted to the first support so that the redirected beam falls upon it, redirecting the beam a second time, through a second plane perpendicular to the centerline of the beam in the region between the first and second mirrors; a second plane that is also parallel to the axis of rotation of the first support.

Contrary to previously disclosed systems, the apparatus of the present invention adjusts beam azimuth by rotation of only the second support and second mirror, and adjusts elevation by rotation of the first support - placing the highest workload, azimuth adjustment, on that portion of the system required to move the least mass, only the low-inertia second mirror.

Other features and advantages of the system of the present invention will be become apparent.

BRIEF DESCRIPTION OF THE DRAWINGS

FIG. 6B is a general view illustrating three of the structures of FIG. 6A stacked for transit.

FIG. 6C is a general view illustrating two of the structures of FIG. 6A interlocked for transit.

FIG. 6D is a general view illustrating the interlocked structures of FIG. 6C in use.

DETAILED DESCRIPTION OF THE INVENTION

Figure 1:
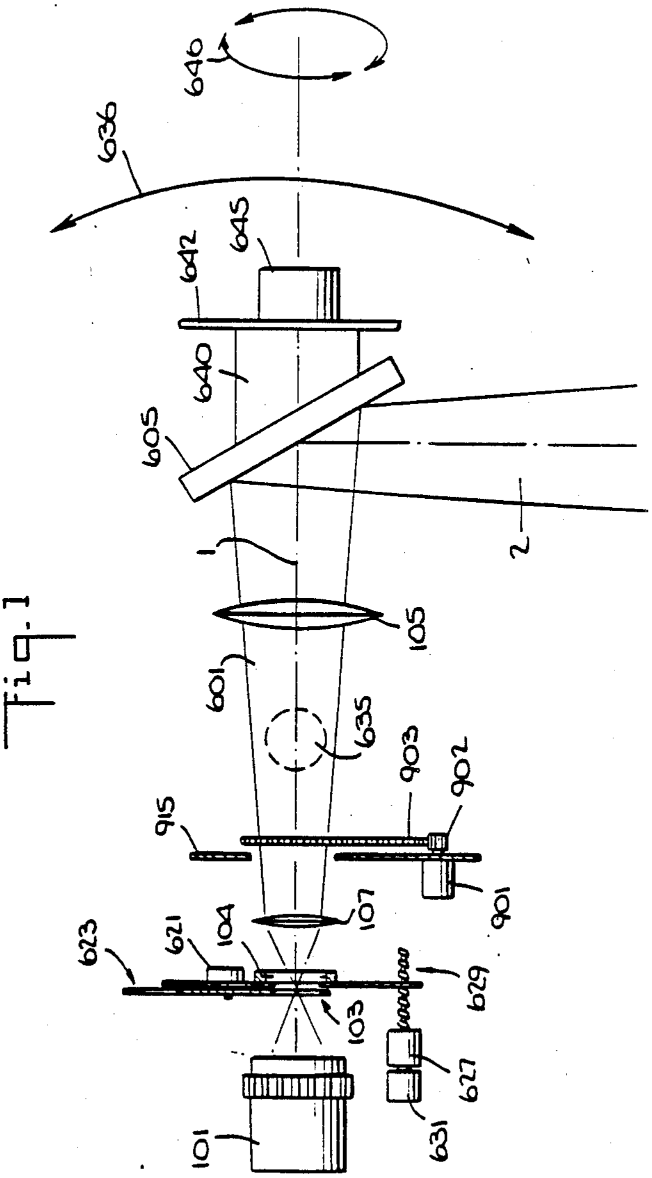
FIG. 1 is a sectional view of a fixture adapted for the azimuth and elevation adjustment method disclosed in the parent application, and is equal to FIG. 1A of that application.

Refer now to FIG. 1A of the parent application, reproduced here as FIG. 1.

A light source with associated light collecting reflector 101 is mounted in a housing. The embodiment illustrated employs two lenses 105 and 107 imaging an aperture 103 for beam-forming. Means are provided to change various beam parameters remotely, including intensity (by an electronic dimmer or a dowser 111 and associated actuator 429), beam size (by iris 104 with an associated actuator 421), beam shape (by gobo wheel 623 with an associated actuator 621), edge sharpness (by actuator 627), and beam color (by filter array 903 with associated actuator 701). Suitable control systems for each of these parameters are disclosed in U.S. Pat. Nos. 4,527,198, 4,600,976, and in the grandparent application Ser. No. 750,873, now U.S. Pat. No. 4,697,227, which are included in their entirety by reference.

A means, here illustrated as mirror 605, is provided for redirecting the beam at substantially right angles to that section of its optical centerline (identified with reference numeral 1) that is between the light source 101 and the means for redirecting, mirror 605. Rotation 646 of mirror 605 by actuator 645 about a first axis parallel to the first section 1 of the optical centerline rotates the beam 601 exiting the means for redirecting such that the second section of its centerline (here identified with reference numeral 2) describes a first plane perpendicular to the drawing, representing the required adjustment in a first axis.

The means for redirecting, mirror 605, may be fixed with respect to the included angle between the first section 1 and the second section 2 of the optical centerline, and the required elevation adjustment provided solely by the rotation 636 of a common mechanical support for light source 101 and mirror 605, here entire housing 642, about a second axis that is perpendicular to the first portion 1 of the optical centerline and parallel to the previously described first plane of adjustment. In the illustrated embodiment, this second axis extends through the center of actuator 635, perpendicular to the plane of the drawing. The rotation 636 of both light source 101 and mirror 605 by actuator 635 thus rotates the beam through a second plane parallel to the first section 1 of the optical centerline and perpendicular to the first plane.

The benefits of this method of adjustment are many and immediate. The adjustment of azimuth is performed by a low mass mirror, minimizing the actuator and drive requirements for the higher workload portion of the system. Because the mirror remains in a fixed angular relationship with the beam, problems of obstruction and "clipping" are eliminated. While the housing must rotate within a yoke, the yoke itself is fixed with respect to the supporting structure and a comparatively inexpensive pivot and actuator may be employed. Further, during any adjustment of azimuth and elevation, the housing can remain perpendicular to the long axis of the supporting structure, and as such the mounting centers between adjacent fixtures can be minimized, maximizing the number of fixtures that can be accommodated on a given supporting structure.

While the disclosed system has many advantages, in the case of the largest and longest of fixtures, followspots, the rotation of the entire fixture about a mechanical axis demands both significant space and motive power.

The size of typical followspot optical systems has long suggested the desirability of employing some form of azimuth and elevation adjustment by mirror, although such fixtures used with the system disclosed in U.S. Pat. No. 2,054,224 have been hampered by the previously described problems of a limited range of adjustment.

No example of the use of the systems disclosed in either U.S. Pat. Nos. 4,663,698 or 4,729,071 for such fixtures is known, but optical efficiency and the focal lengths generally required of such fixtures have mandated a relatively large exit diameter for the beam. The disadvantage of the systems disclosed in these two patents—that the mirror assembly must be more than two or three times wider than the diameter of the beam, with the effect on the mechanical design issues previously described—suggest that such systems are less than ideal solutions for such fixtures.

Figure 2B:
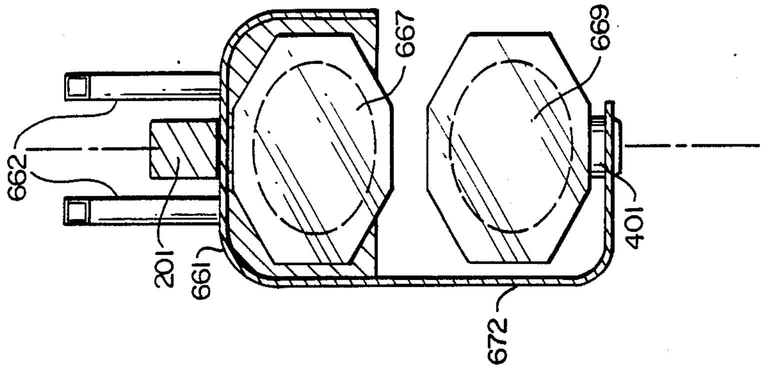
FIG. 2B is a sectional view of the first support and associated frame of FIG. 2A looking away from the fixture.
Figure 2A:
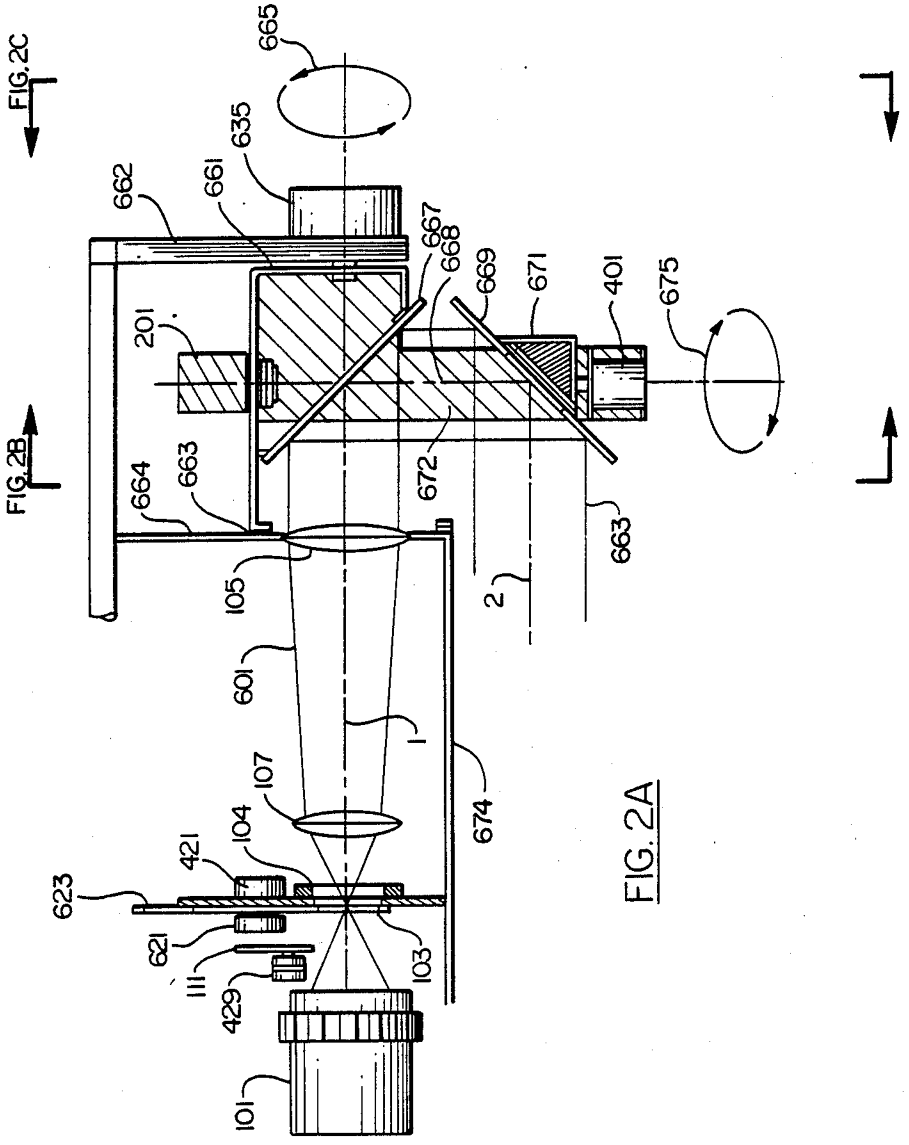
FIG. 2A is a sectional view of a fixture adapted for the improved azimuth and elevation adjustment system of the present invention.
Figure 2C:
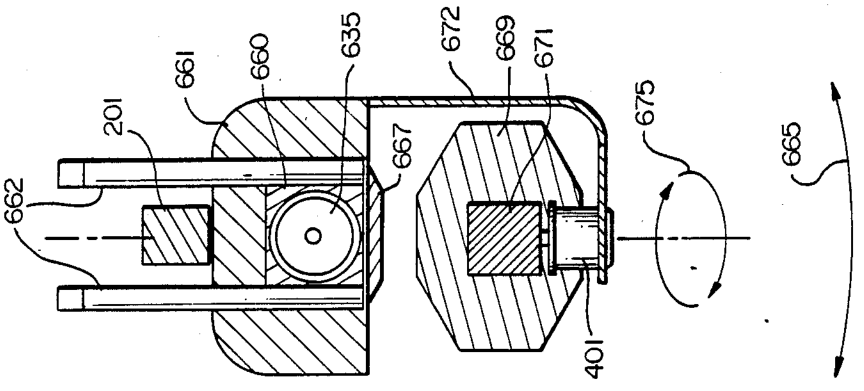
FIG. 2C is an end elevation of the first support and associated frame of FIG. 2A looking towards the fixture.

Refer now to FIG. 2A, a sectional view of a fixture employing the improved azimuth and elevation adjustment system of the present invention, and to related FIG. 2B and 2C. Parts having the same function as those of FIG. 1 are identified with the same reference numbers.

Light source and associated light collecting reflector 101 is mounted in a housing. An optical system including lenses 105 and 107 image aperture 103, forming a beam. Means are provided to change various beam parameters remotely, including intensity (by dowser 111 and associated actuator 429), beam size (by iris 104 with an associated actuator 421), and beam shape (by gobo wheel 623 with an associated actuator 621). Other such means may be provided.

Beam 601 exits lens 105, which is retained at the front bulkhead 664 of the housing, with the centerline 1 of the beam substantially horizontal.

A first means for redirecting, here mirror 667, is mounted to a first support 661, such that beam 601 falls upon it. This first support 661 is mounted such that it, and mirror 667, can be rotated 665 about an axis coincident with the beam centerline 1, such that the centerline 668 of the redirected portion of the beam defines a first plane, that first plane substantially perpendicular to beam centerline 1.

In the illustrated embodiment, this mounting is accomplished by providing a structural framework 662 attached to the fixture housing and extending beyond its forward bulkhead 664 that carries a plate 660, on which is mounted a rotary actuator 635, whose shaft is coincident with the centerline 1 and to which the first support 661 is attached.

First support 661 includes a projection or "stirrup" 672 that provides for the attachment of rotary actuator 401, such that its shaft is coincident with the centerline 668 of the redirected portion of the beam. A second means for redirecting, here mirror 669, is mounted to the shaft of rotary actuator 635 by means of wedge-shaped bracket 671, such that the portion of the beam redirected by mirror 667 falls upon it, redirecting the beam a second time such that the centerline 2 of the twice-redirected beam 663 may be rotated through a second plane which is perpendicular to beam centerline 668 and to the first plane, and parallel to beam centerline 1. The distance between the two means for redirecting is such that the twice-redirected beam 663 clears the lower surfaces 674 of the housing.

The system of FIG. 2A thus provides for the adjustment of the beam through two axes in a manner similar to the applicant's system of FIG. 1, but does so without requiring the displacement of the fixture as a whole. Only a low-mass mirror need be displaced in one axis, and only the weight of that mirror and its actuator in the other.

Unlike the single mirror two-axis displacement system first disclosed in U.S. Pat. No. 2,054,224, azimuth and elevation adjustment are, for practical purposes, unrestricted. The system of FIG. 2A permits adjustment in at least 180 degrees of elevation and 270 degrees or more in azimuth. By substituting a U-shaped bale of slender metal or graphite rod for the "L"-shaped extension 672 illustrated in the Figure, the beam may be rotated continuously through 360 degrees with little or no apparent effect on the beam.

While there are certain structural similarities to the systems disclosed in U.S. Pat. Nos. 4,663,698 and 4,729,071, the system of the present invention offers a number of important advantages.

The means required for rotation of the first support relative to the fixture housing is much simplified. The first support can be directly driven by the actuator, eliminating the requirement for driving the perimeter of a large open-centered rotational coupling using belts or gears. While the embodiment of FIG. 2A includes a circular bearing 663 mounted to the front bulkhead 664 of the fixture housing coaxial with lens 105, it is provided only to further simplify the mechanical design; bears comparatively little weight; and requires no provisions for actuation. Even were the first support driven from the circular bearing, the ability to employ a pivot such as a pillow block at the location of actuator 635 eliminates eccentric loading of the rotational coupling. It will also be apparent that the weight of first support 661 could be borne entirely at the end towards actuator 635, with no attachment to the front bulkhead 664 of the housing, and that the mechanical design of such a coupling would still be simplified relative to the system disclosed in either prior U.S. Patent by the elimination of the requirement that the coupling and its means of actuation also provide a large, unobstructed opening for the passage of the beam.

The rotation of the second support relative to the first support is also simplified. Again, the means for redirecting can be driven directly and, unlike the system of U.S. Pat No. 4,663,698, no rotational coupling large enough to pass the beam is required, nor, in such an embodiment, does the second support produce an eccentric loading of the rotational coupling between the first support and the fixture. The first support rotates the second support through a relatively limited angle, so that a commutator is not required to couple power to rotary actuator 401, and extra-flexible leads dressed from the frame 662 to the first support can be used instead.

Unlike both such prior systems, the mirror assembly itself is compact and its increase in the total optical path length of the fixture is modest.

Most importantly, in the system of the present invention, adjustment in the axis in which the largest and most frequent adjustments are typically required, azimuth, requires movement of the least mass, which, with the other mechanical advantages of the disclosed system, produces substantial practical benefits.

As disclosed in the parent and grandparent applications, a non-planar mirror can be used for mirror 667 and/or mirror 669 as a beam-forming element, to shorten the total optical path length. By employing such a mirror with a divergent effect for mirror 669, the beam may be made parallel-sided or convergent to that point, and the size of the mirrors minimized. For the same purpose, the optical system may be designed to produce a focal point in front of the fixture.

As disclosed in the parent and grandparent application, a variable-curvature mirror as disclosed in U.S. Pat. No. 4,460,943 may be employed as both a beam-forming element and as one of the means for redirecting.

The system of the present invention may also provide for an imaging device for use in establishing the current azimuth and elevation of the beam and the subject included in it, as disclosed in great grandparent application 443,127, now U.S. Pat. No. 4,527,198. FIG. 2 illustrates a CCD camera 201 mounted to the top surface of bracket 661, with its lens coincident with beam centerline 668. Mirror 667 is of the half-silvered type, such that it permits the redirection of beam 601 while also permitting camera 201 a field-of-view which is the same as the beam. The weight of camera 201 also helps counterbalance motor 401. A counterweight for this purpose may also be specifically provided. Alternatively, the camera tube could be mounted to rotate with mirror 669.

While the systems of U.S. Pat. Nos. 4,663,698 and 4,729,071 employ mirror assemblies that protrude significantly beyond the envelope of the fixture housing itself, not only increasing the fixture's total height but themselves subject to damage in handling, the improved system of the present invention permits embodiments avoiding both such problems.

Figure 3A:
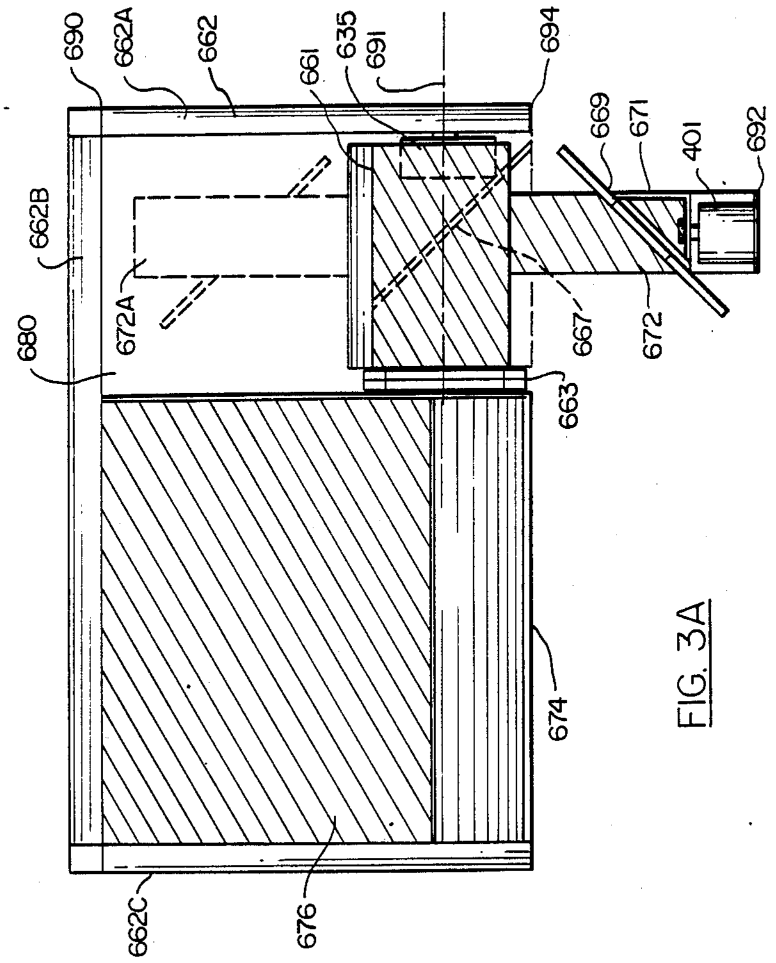
FIG. 3A is a side elevation of another fixture employing the improved azimuth and elevation adjustment system of the present invention.

Refer now to FIG. 3A, a side elevation of a fixture generally equivalent to the fixture of FIG. 2A.

The framework 662 forming the outer chassis of the fixture housing includes top rails 662B and side rails 662A and 662C. That portion of the volume contained within occupied by the light source, the optical system, and the beam-varying means is located behind side cover 676 and semi-cylindrical bottom cover 674. The beam exits this portion of the fixture along axis 691, to be redirected by mirror 667 and 669 in the manner previously described. An alternative installation of rotary actuator 635 is illustrated, with the actuator fixed to the first support 661 and its shaft fixed to the frame 662, such that rotation of the actuator shaft produces rotation of the first support.

It will be apparent in examining the Figure, that as the distance between the rotational centerline of the first support 691 and the farthest extremity of the extension supporting mirror 669 is less than the distance between rotational centerline 691 and top rail 662B, that the first support 661 can be rotated by actuator 635 through 180 degrees from the position illustrated, such that extension 672 is vertical (as indicated by dashed outline 672A) and that the first support, second support, and both mirrors are retracted for shipping or storage completely within the volume 680 defined between top rail 662B and the lower surfaces 674 of the housing and of end rail assembly 662A.

Figure 4:
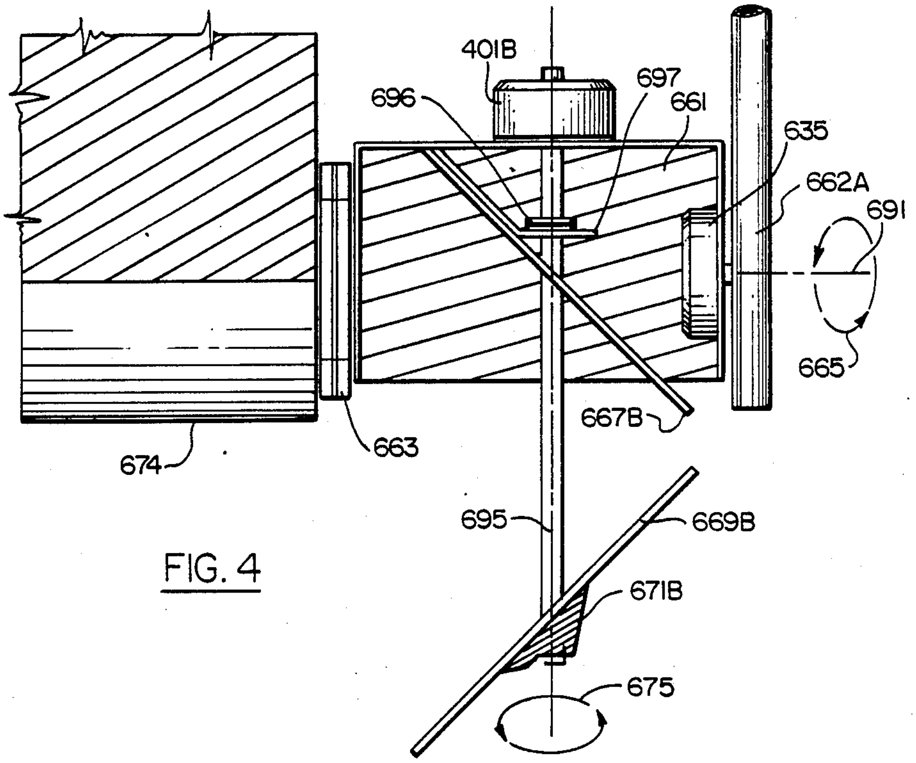
FIG. 4 is a detail of an alternative embodiment of the first and second supports.

Various constructions of the first support and methods of supporting and actuating the second mirror are possible and should not be understood as limited except by the claims. Refer now to FIG. 4, a detailed view of one such method.

A first support 661 is rotatably mounted between the front bulkhead of the fixture housing (by ring bearing 663) and end frame 662A (by the shaft of rotary actuator 635), as in the previous Figures. The rotary actuator 401A used for azimuth adjustment is, however, mounted to the top surface of first support 661. A thin shaft 695 (not to scale) of graphite, for example, is driven by the actuator 401A and passes downward through a pillow block 696 that is mounted on the bracket 697 also used to support mirror 667B. A pass hole is provided in the center of mirror 667B for shaft 695. A lightweight mirror 669B, for example of electroformed construction, is provided as the second means for redirecting. A pass hole in the surface of the mirror 669B permits passage of the shaft 695, which is fixed to bracket 671B. Shaft 695 may be coaxial with the centerline of the beam as redirected by first mirror 667B. Rotation of actuator 401B thus rotates the beam 675 through a second plane while rotation of actuator 635 rotates 665 the second mirror 669B through a first plane, in the manner previously described. A CCD camera 201 can still be accommodated if it is offset relative to the centerline.

The method of FIG. 4 has the advantage of markedly reducing the moment arm presented by the second mirror assembly relative to the previously presented embodiments, by relocating the actuator and simplifying the remaining structure. In its new location, actuator 401B moves the center of gravity of first support 661 closer to its rotational centerline 691. Shaft 695 is expected to have little or no effect on the beam, and any such effect can be compensated for by curvature of mirror 669B.

Alternatively, a more conventional extension can be used to support the second mirror, and its actuator located substantially as shown and coupled to the mirror by rigid or flexible shafting and bevel gears, but this increases the mechanical complexity of the system.

Figure 3B:
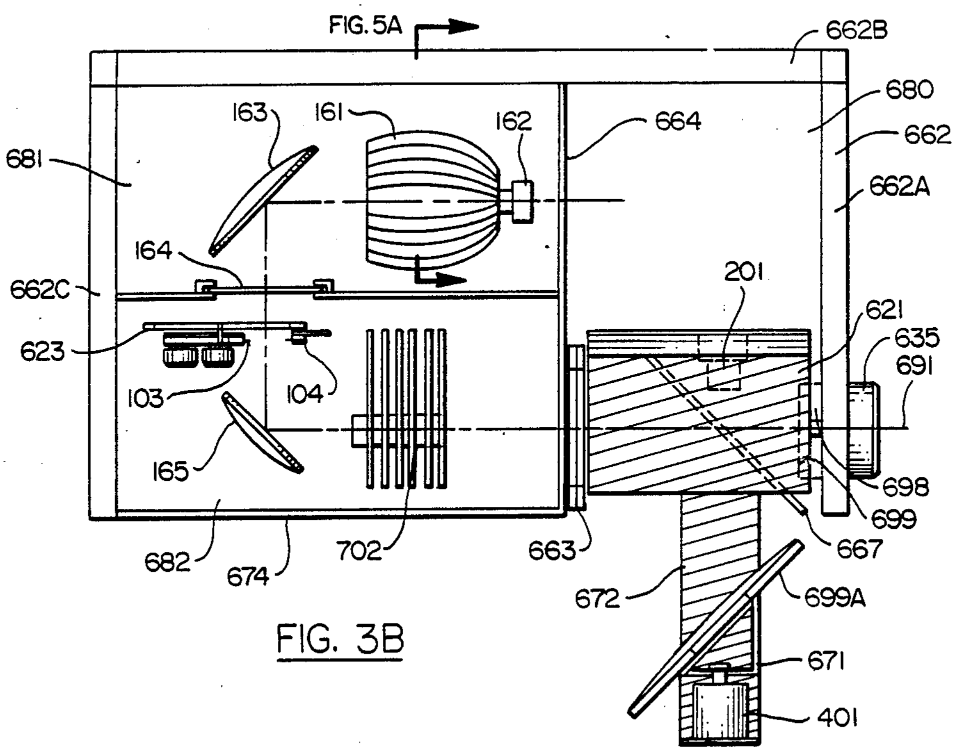
FIG. 3B is a side elevation of the fixture of FIG. 3A showing the internal light collecting, beam-forming, and beam-modifying elements.

Refer now to FIG. 3B, a side elevation of the fixture of FIG. 3A with side cover 676 and bottom cover 674 removed.

The overall length of the fixture has been further reduced by folding the optical system. The light source consists of a bulb retained by socket 162, the light center of the bulb located at a focal point of reflector 161.

Although many different optical system designs could be used, FIG. 2B illustrates one having no lenses and employing non-planar mirrors in various capacities.

Insofar as heat and radiant energy in the light beam have always presented difficulties in fixture design, the fixture of FIG. 3A and 3B has been designed to minimize them. In this regard, reflector 161 is a novel design illustrated in greater detail in FIG. 5A, 5B, and 5C.

Reflectors for use in most types of beam-producing fixtures should collect the highest practical percentage of light emitted by the source. This object suggests the use of a reflector which, so far as practical, surrounds the light source, leaving only an opening for the beam to exit, and for those portions of the lamp and/or socket that must protrude through the reflector. However, employing such a reflector also has the effect of creating a substantially closed chamber, within which the heat and radiant energy produced by the lamp quickly raises internal temperatures to the point that the useful life of the bulb and/or socket may be reduced.

Figure 5A:
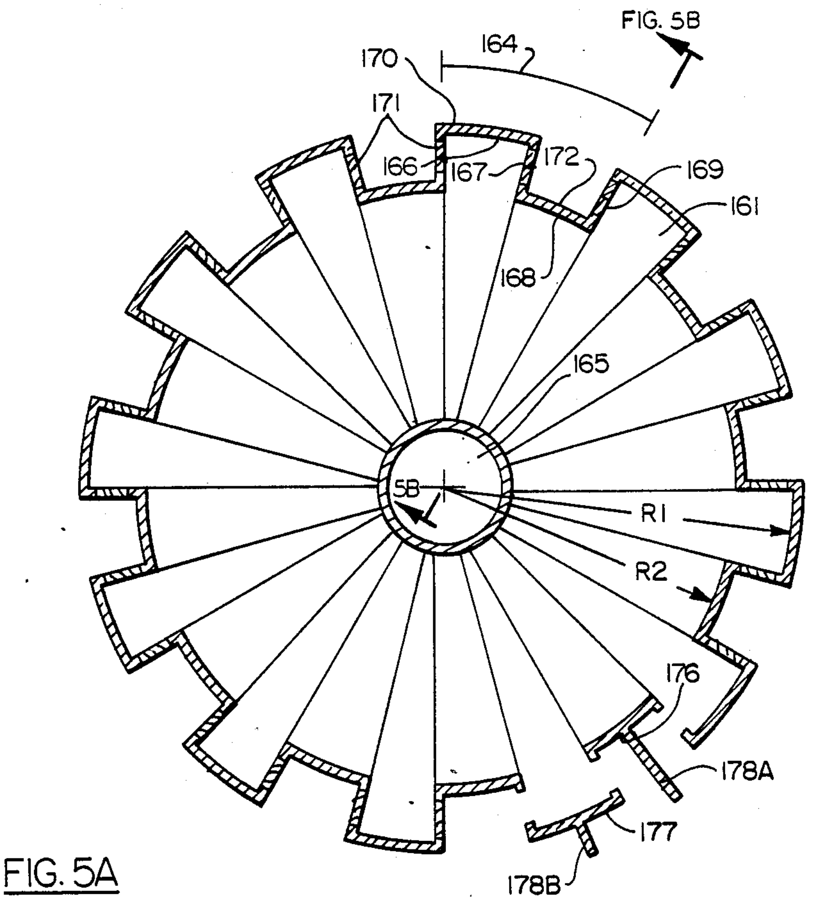
FIG 5A is a section through the reflector employed in the fixture of FIG. 3A and 3B.
Figure 5B:
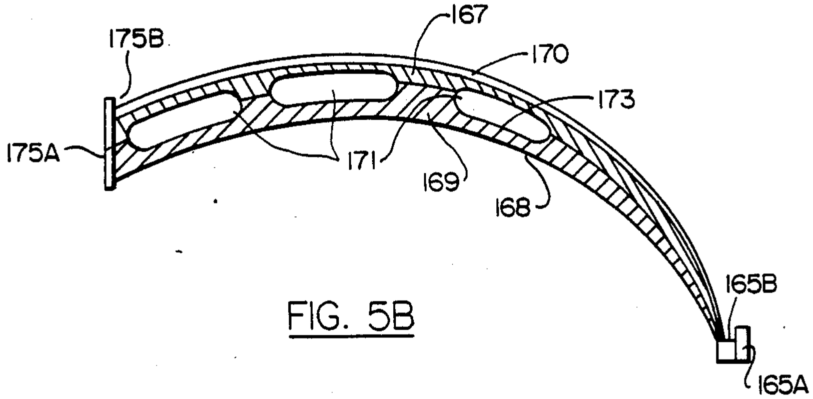
FIG. 5B is a side elevation of one reflector element pair of the reflector of FIG. 5A.
Figure 5C:
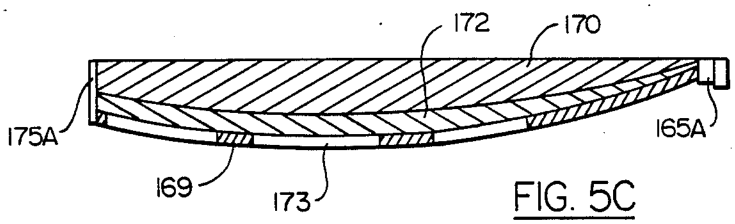
FIG. 5C is a plan view of the reflector element pair of FIG. 5B.

Refer now to FIG. 5A, 5B, and 5C, which disclose a reflector of improved design.

FIG. 5A is a sectional view of the reflector of FIG. 3B through a plane perpendicular to the optical centerline of the reflector.

A typical prior art reflector represents the surface of an ellipsoid, whether continuous or "double-flatted", and, when employed with modern single-ended axial bulbs, provides an opening coaxial with the centerline at one end for the bulb, and a larger opening at the other end for the beam to exit.

The reflector of FIG. 5A has a compound shape derived from two nested ellipsoids; one having reflective surfaces such as 166 of radius $R_1$, and one having reflective surfaces such as 168 of radius $R_2$. Cutting planes, passing through the centerline, each of which is rotated 15 degrees with respect to the other, divide the two reflectors into "slices". The inner reflective surface is removed in every other "slice", producing a compound reflector shape alternating radially about its centerline, between a surface with a radius of $R_1$ and a surface with a radius of $R_2$. The "step" formed at each cutting plane with a height of $R_1$-$R_2$ may be open, and therefore, while the reflective surface appears continuous from the focal point of the reflector, it is largely open insofar as air circulation is concerned. Operating temperatures within the volume defined by the reflector may, therefore, be significantly reduced.

Many methods of fabricating such a compound reflector are possible.

One method is to cast or electroform each reflector "slice" separately, as is illustrated in the lower right quadrant of FIG. 5A. Two elements, one, 176, with radius $R_2$, and the second, 177, with radius $R_1$ are used to assemble the compound reflector, these elements interlocked at either end. The reflector "slices"/elements can be stiffened by means of cast or formed ribs. Such ribs, including 178A and 178B, can also interlock with notches in a ring in a plane parallel to that of the drawing Figure, as a means of assembly.

Another method is to cast or form reflector elements so that they interlock with each other, as is illustrated in the upper right quadrant of FIG. 5A. In the illustrated embodiment, the 24 reflector elements have been divided into 12 reflector element pairs, such as the one subtending arc 164, illustrated in FIG. 5B and 5C.

One reflector element of radius $R_1$, one reflector element of radius $R_2$, the "riser" of the "step" between them 167, and half of the "risers" of the "steps" to adjacent pairs 169, are cast in a single operation. Openings 171 are provided in the intermediate "riser" 167, and the cutbacks 173 required to produce such openings when pairs are assembled are provided in the "half-risers" 169. Details for interlocking the "half-risers" 169 of two reflector element pairs can be provided, as well as similar provisions at the ends where the assembled reflector provides its openings, flanges 165A and 175A. Grooves 165B and 175B, formed at the flanges, permit locking the elements in place with a retaining ring.

The compound reflector can also be formed or cast in half-sections, joined at the plane of FIG. 5A, with secondary operations producing the openings 171 in the "risers"

The size and shape of openings 171 can be varied from point to point on the reflector to expedite or induce the movement of air in the known manner.

By reducing the operating temperature in the region of the lamp, the reflector of the present invention not only improves the usable life of the bulb for a given reflector design, but may permit the use of lower-temperature materials for reflector fabrication, such as known infrared-transparent plastics. The built-in stiffening ribs of many embodiments also resist distortion of reflector shape by heat.

Returning to FIG. 3B, reflector 161 directs the output of the bulb towards a concave mirror 163 that serves as a condenser, which is preferably fabricated as a dichroic "cold mirror" redirecting the condensed light downwards towards the gate assembly through known dichroic "hot mirror" 164. Dichroic "hot mirror" 164 is mounted on an insulated partition separating the upper section 681 of the enclosure from the lower section 682 that contains the beam-modifying elements. The two sections may therefore be separately ventilated for temperature control.

Lower section 682 contains the gate assembly with aperture 103, iris 104, and gobo wheel 623; a color synthesizer 702, and beam-forming mirror 165.

Color synthesizer 702 consists of five or more interference-film filters, each such filter blocking or "notching" the light output of the fixture within a narrow bandpass region. The visible spectrum is divided into a series of adjacent bandpass regions, and one filter provided for each such region, each such filter adapted for movement in and out of the beam, such that the relative proportion of energy in that bandpass region may be separately and continuously adjusted. By the appropriate adjustment of each filter, preferably under automatic control, a relatively limited number of filters are capable of mimicking or synthesizing the color sensations and effects of a vastly larger number of "gel" filters.

As previously described, the beam exiting the housing at bulkhead 664 through ring bearing 663 is parallel-sided or slightly divergent, and a convex mirror 669A is used as a divergent element. The beamspread of the fixture may be adjusted over a wide range by changing convex mirrors.

Finally, many motorized or automated fixtures that require the rotation of one portion of the housing relative to another frequently also require coupling motive power for an actuator in one portion with drive circuitry in another. Where feedback information as to motor position is required, additional conductors are required to return such information to the motor drive. The result is the requirement for a commutator, or more practically, a harness of discrete conductors dressed across the pivot between one portion and the other and a limit on rotation to prevent "corkscrewing" the harness. Both commutators and wiring harnesses have finite lives. The fixture of FIG. 3B employs a means of coupling power and control data between the fixture housing proper and first support 661. A wound coil 698 is mounted to end frame 662A, coaxial with the center of rotation 691 of first support 661. A second coil 699 is mounted to the end of first support 661, coaxial with center of rotation 691 and aligned with coil 698. The result is an air-gapped transformer that permits coupling power for motor 401 to the first support in a manner immune to wear. Coil ratios can also be varied to permit stepping voltage and current up or down. When multiple actuators are supported on the rotating portion; the actuator is multi-phased or has other special power requirements; and/or feedback information is required from the actuator, it may be simpler to couple power supply across to the rotating portion and mount the electronics on the rotating portion. Desired position data can then be encoded upon the power supply waveform; or commutated by wireless means including infrared transmission through or near a pivot. For example, in the system of FIG. 3B, the infrared LED could be placed at the opening in bulkhead 664 and shine into the first support where the detector would be located; be placed on a bracket above the back of actuator 635, shining through a hollow actuator shaft to a detector supported in a similar manner above the fixed end of the shaft within first support 661; or multiple such LEDs mounted to end frame 662, in a ring concentric about the shaft of actuator 635, shining on a detector mounted on first support 661.

Conversely, information can be transmitted electronically from the first support back to the fixture by similar means.

It must be determined whether the magnetic field produced by the "primary" coil would interfere with actuator 635 or the electronics, and if so, it must be relocated or shielded as required.

The improved azimuth and elevation adjustment system of the present invention has the added benefit of being compatible with smaller fixtures employing the system of the parent application in the same high-density lamp-supporting structure.

The parent application, 940,934, included in its entirety by reference, illustrates how the improved azimuth and elevation adjustment system disclosed in it may be employed to produce a lamp-supporting and -enclosing "truss" structure that accommodates a larger number of fixtures in a given volume than any prior such structure.

Figure 6A:
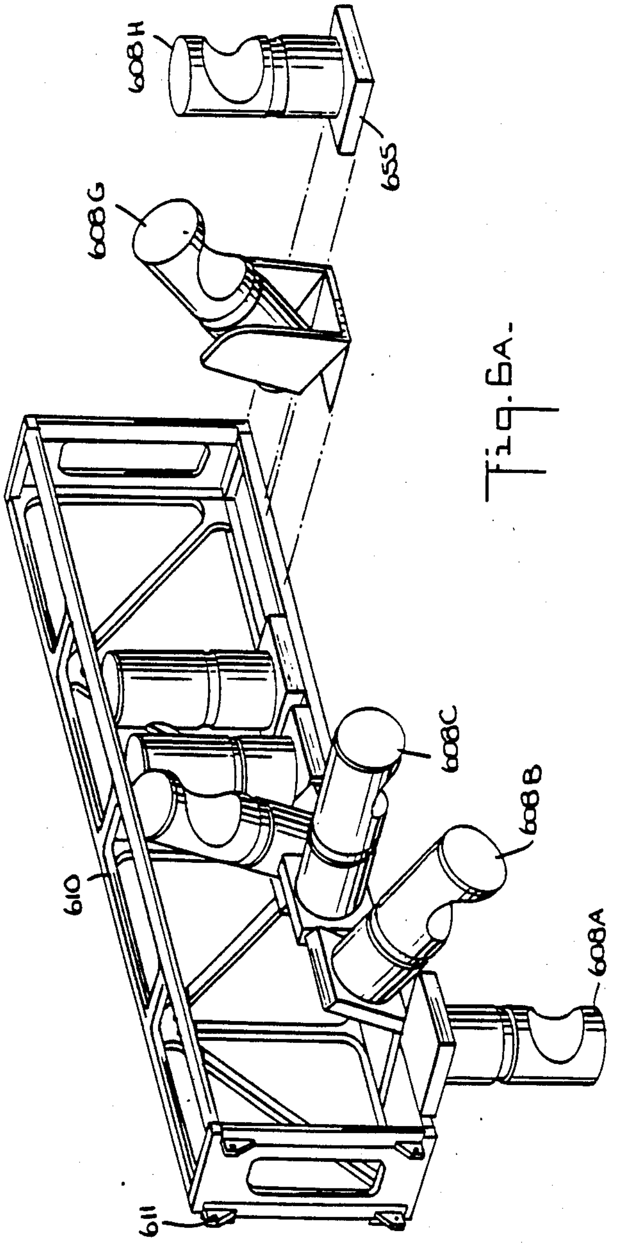
FIG. 6A is a general view of one embodiment of a lamp supporting and enclosing structure employing fixtures adapted for the improved azimuth and elevation method of the parent application equal to FIG. 6A of that application.

Referring now to FIG. 6A, equal to FIG. 6A of the parent application, one embodiment of a lamp supporting and enclosing structure employing fixtures adapted for the azimuth and elevation adjustment method of the parent application particularly suited to portable use is illustrated.

In the presently preferred embodiment, a section of such lamp enclosing structure 610 preferably measures approximately 27" in height, 11" in depth, and 96" in length, these dimensions making the most efficient use of truck space.

Due to the unique advantages of the azimuth and elevation adjustment method of the present invention, one such section can accommodate at least eight fixtures 608A-608H in a volume which permits a 40% reduction in the volume of truck space required by a given number of fixtures relative to the present standard lamp enclosing truss structure—while requiring less setup labor. Further, any number of such fixtures may provide motorized adjustment at no penalty in space requirements.

For example, referring to FIG. 6B, three such sections 610A-610C can be stacked face down on a common dolly or casterboard 650, interlocked by means of fittings 612 protruding from the rear side of each section. The resulting stack accommodates 24 fixtures in a volume only 3" higher than a prior art lamp enclosing truss accommodating only 12. The reduction of section height from 30" to 27" permits the stack to pass through a 28" door.

Alternatively, the fittings 612 of any two sections 610 may be used to interlock the sections back-to-back, four such sections accommodating 64 fixtures in the same volume as three sections of prior art lamp enclosing truss accommodating only 36.

With the reduction in height to 27" and an embodiment containing nine fixtures in three bays of each section, 288 fixtures could be accommodated in the same floor area of a tractor-trailer as the 96 fixtures of present 30"×30" lamp-enclosing truss designs. This unprecedented reduction in shipping volume comes at no cost in flexibility, for the illustrated truss section can be adapted to a greater number of desirable configurations than any prior art lamp enclosing truss design.

Single sections may be joined by means of provided clevis fittings 611 (or by other suitable means), to form single row trusses of any length.

As illustrated in FIG. 6D, sections interlocked back-to-back, as illustrated in FIG. 6C, may then be joined lengthwise by means of provided clevis fittings 611, to form double row trusses of any length.

Figure 6F:
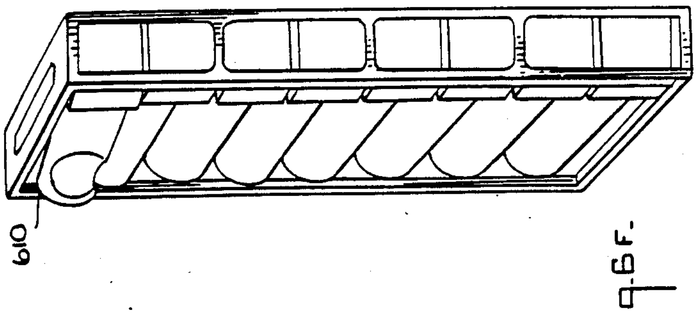
FIG. 6F is a general view illustrating one of the structures of FIG. 6A in use as a vertical ladder.
Figure 6E:
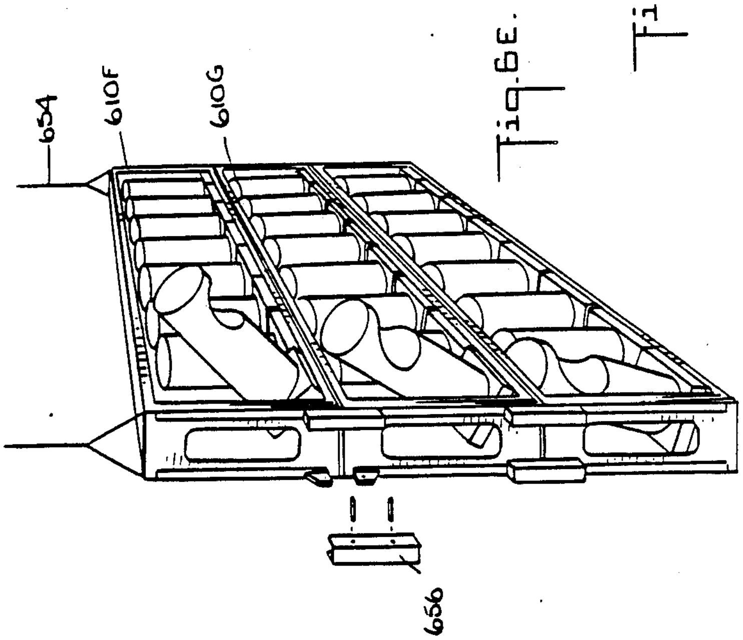
FIG. 6E is a general view illustrating three of the structures of FIG. 6A interlocked in a vertical array.

As illustrated in FIG. 6E, sections can be stacked, hung, or interlocked by any suitable means (here brackets 656 joining clevis fittings 611) to form vertical arrays.

As illustrated in FIG. 6F, sections can be stood or hung vertically.

Figure 6G:
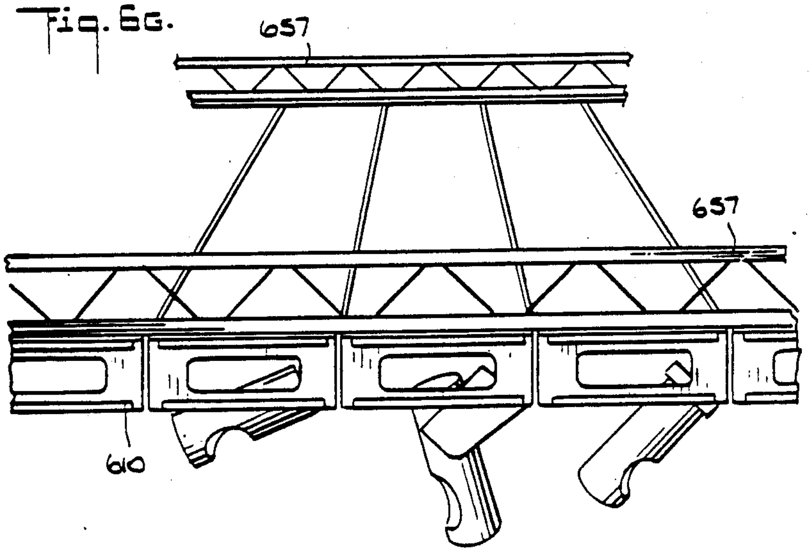
FIG. 6G is a general view illustrating a plurality of the structures of FIG. 6A interlocked to form a horizontal array.

And as illustrated in FIG. 6G, sections can be interlocked to each other or to a common supporting structure (here putlogs 657 using fittings 611) to form horizontal arrays.

Figure 6H:
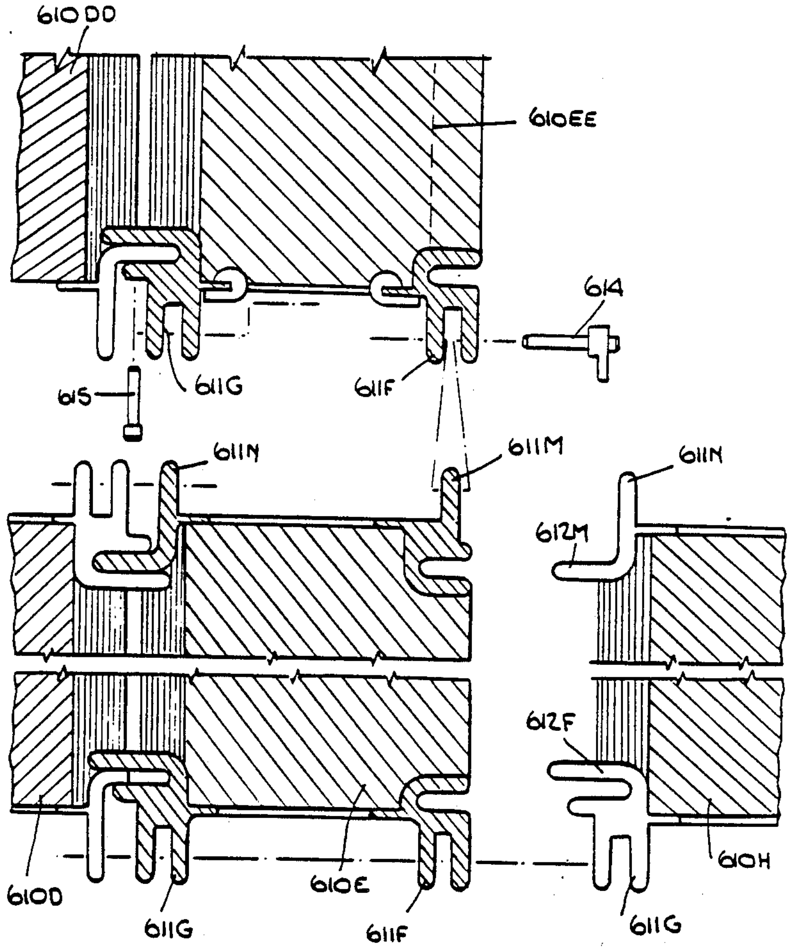
FIG. 6H is a sectional view illustrating one possible embodiment of suitable fittings for interlocking the structures of FIG. 6A, equal to FIG. 6H of the parent application.

FIG. 6H is a sectional view illustrating the operation of one possible design for fittings 611 and 612.

Fittings 612M and 612F, protruding from the rear side of structure 610, permit both the stacking of sections back-to-front (as illustrated in FIG. 6B and shown here in the case of sections 610E and 610H) and the interlocking of sections back-to-back (as illustrated in FIG. 6C and shown here in the cases of sections 610D and 610E and of sections 610DD and 610EE). Male fittings 611M and 611N of one section mate with female fittings 611F and 611G of a second section to permit the assembly of both single row structures and the double row structure illustrated in FIG. 6D.

An end-frame assembly can be cast or forged as a single unit, incorporating the various fittings.

Such sections can be joined lengthwise by known bolts or latches extending parallel to the elongated axis of the structure. The flanges of the fittings 611N and 611M and of 611G and 611F may provide pass holes for clevis pins such as 614 to permit "pinning" the sections 610E and 610EE together in the known manner.

However, all such clevis arrangements have the disadvantage of requiring alignment of the pass holes in the male part with those in the female part before the pins can be inserted or removed. This becomes difficult when the truss sections are resting on a floor or stage surface that is not level. In a preferred embodiment, the sections of FIG. 6A and 6H are provided with an improved compound locking arrangement.

Three equally-spaced pass holes are provided along the elongated axis of flange 611F and corresponding pass holes in flange 611M. An E-shaped assembly consisting of an upper and lower clevis pin forming the upper and lower horizontals of the "E" and a longer shaft of hexagonal section forming the center horizontal are joined by a common handle forming the vertical. The horizontal elements are spaced so that they align with the pass holes in the flanges. A Dual-Lock latch (as manufactured by Simmons Fastener Corporation, Albany, N.Y. 12201) is mounted on the interior face of flange 611F, such that its latch hook rotates through a plane parallel to the front face of the section 610E and engages a pin on flange 611M. The latch is mounted such that the hexagonally-shaped hole in the latch body provided to accept an actuator shaft aligns with the center set of pass holes in flange 611F. The E-shaped assembly is aligned with the three pass holes and inserted from the side exterior to the section. A compression spring is slipped over the center, hexagonal shaft from the interior side and retained against the side of the latch by a cap on the end of the hexagonal shaft. As a result, the E-shaped assembly is drawn towards flange 611F, the clevis pins passing through their respective pass holes, and the vertical handle drawn flush with the exterior of flange 611F.

In this position, section 610E and 610EE cannot be joined because of the pins through flange 611F. The user must grasp the handle of the E-shaped assembly and pull it—and the clevis pins forming its upper and lower horizontals—clear of the flange 611F, where, preferably, it is held by a detent installed in the center hexagonal shaft. The user may then mate the male and female flanges of the two sections. It is, however, not necessary for the user to attempt to jockey the pass holes in the flange of one section into alignment with those in the flange of the other. By grasping and turning the handle of the E-shaped assembly through 180 degrees, the user extends the Dual-Lock latch from its housing, which hooks the pin on the other section; draws them together and into alignment; and locks in place. The compression spring then urges the clevis pins towards their now-aligned pass holes and the vertical of the assembly towards its flush position. The result is a rapid and automatic alignment of the pass holes in two truss sections for insertion of the clevis pins. No tools are required and there are no parts to lose or misplace. The extended handle of the U-shaped assembly provides a clear indicator visible at a considerable distance that the sections have not yet been properly joined. The E-shaped assembly may also be provided with a feature that prevents the insertion of the clevis pins when a male flange is present, unless the assembly has been rotated and the sections latched together.

Flanges 611G and 611N can be pinned at the same time by providing pass holes in them; fabricating a C-shaped unit that slides over the end of the central, hexagonal shaft of the E-shaped assembly after its insertion through the latch, and its retention such that it remains at the same location on the shaft but is free to rotate; and the provision of means to keep the clevis pins of the C-shaped unit aligned with their pass holes.

Other variations in the design are possible.

Preferably, a variety of fixtures employing different light sources, optical systems, and azimuth and elevation adjusting means will be adapted to a common modular format such that any combination (e.g. 608G and 608H) may be inserted in a section of supporting structure.

Preferably, electronic dimmers (such as disclosed in copending application 943,381, included in its entirety by reference) and the actuator electronics required by each fixture will be mounted in the same modular unit (e.g. in enclosure 655 of fixture 608H) or in an associated modular unit, which mechanically and electrically connects with the supporting structure 610; the supporting structure also serving to distribute power and signal from a single multi-pole inlet connector.

Preferably, the fixtures are also adapted to permit their use independent of the supporting structure (for example as "floor specials"), as well as their external attachment to it (where a limited number of additional fixtures insufficient to justify adding an entire section is required).

Preferably, a local control system as disclosed in the grandparent application will be provided for each fixture or section.

It will be apparent that a section can be designed whose operation is similar to that of FIG. 4A–C of the parent application, and which may be used and interlocked with the design of FIG. 6A, and that the disclosed dimensions of section 610 may be varied.

The displacement of the fixtures in either embodiment of the structure is preferably performed by actuators, as is the retraction of casters. Preferably this actuation is performed by a fluid-powered system controlled by a predominantly fluidic control system—offering far lower weight and complexity and a higher degree of reliability than an electro-mechanically-controlled system.

Further, any such lighting system with distributed dimming and/or motorized or automated fixtures requires the use of power electronics that produce heat that must be removed. The elevated ambient temperatures around the fixtures; the need to minimize total size and weight; and the desirability of avoiding forced-air cooling in order to minimize audible noise, maximize reliability, and minimize the intake and accumulation of dirt and dust, all mitigate against the use of traditional cooling techniques.

Instead, the improved lamp supporting structure of the present invention provides for mounting power electronics on heat sink extrusions that are preferably also portions of the truss structure itself, and through which passages for liquid cooling, such as by Flourinert liquid are provided. Preferably those passages and that liquid are also a part of the fluid power system previously described. Alternatively, tubing containing the liquid can be run through channels provided in the structure and thermally-conductive compounds used to couple heat from tubing to the structure. The result is a unified and uniquely elegant solution to the problems of structure, actuation, and cooling.

Like prior art lamp-supporting and -enclosing structures, the structure of FIG. 6A and the above described variation adapted for vertical displacement of the fixtures are designed to accommodate fixtures of relatively modest size. Unlike most prior art systems, the improved azimuth and elevation adjustment system of the present invention permits building fixtures with far larger optical systems in a format that is uniquely capable of being accommodated within such structures. Referring to the fixture of FIG. 3A and 3B it will be apparent that by inverting the fixture it may be installed in the truss section of FIG. 6A in lieu of any three adjacent smaller fixtures 608A–H. Similarly, it could be installed as illustrated within a section of truss displacing the fixtures vertically. Fixtures employing the azimuth and elevation system of the present invention are thus uniquely suited as components of a total lighting system.

Conversely, many of the techniques used in the improved fixture of FIG. 3A and 3B can be employed in other fixture types.

Figure 7:
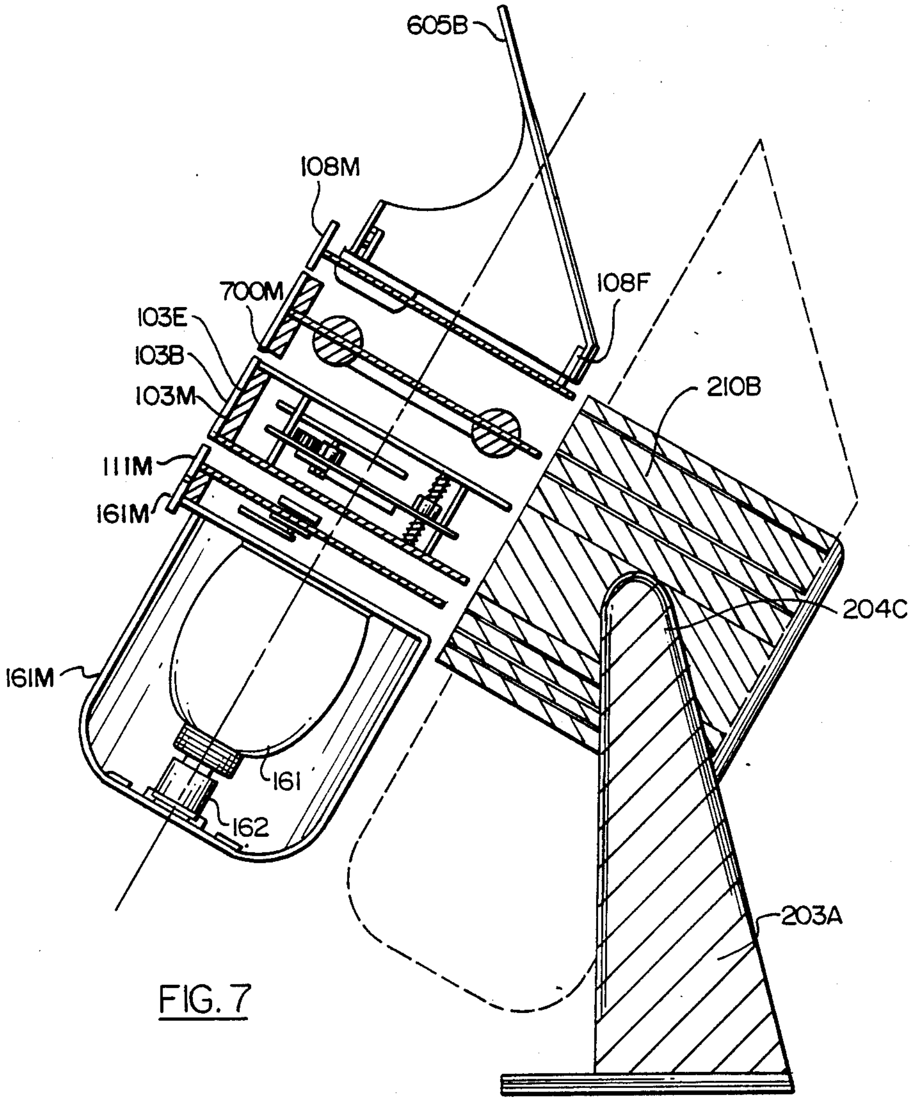
FIG. 7 is a side elevation of a fixture suitable for use in the structure of FIG. 6A, employing the reflector of FIG. 5A.

Refer now to FIG. 7, where a detailed view of an improved fixture equivalent in operation to 608G and in general structure and operation to the fixture of FIG. 1 is illustrated.

The fixture proper is supported on a yoke 203A, which may contain the elevation adjustment actuator.

The fixture itself is entirely modular, consisting of a U-shaped cast aluminum chassis 210B, incorporating grooves into which a plurality of modules slide. Power supply is coupled to the chassis 210B, preferably by either inductive coupling at pivot 204C or by employing the shafts themselves as conductors. Control information may be coupled from the yoke to chassis 210B by infrared or other wireless means. Chassis 210B contains a backplane into which the modules plug. The function of the backplane is preferably limited to the distribution of power and control signals.

A lamphouse module 161M slides into the lowest position in chassis 210B. It includes a reflector 161 of the type illustrated in FIG. 5A, and a removable lampholder assembly including socket 162 that may incorporate a single-ended halogen lamp (such as an FEL), a low-voltage halogen lamp, or a tin-halide, CSI, or other discharge source.

Alternatively, a module with a known HTI-400 or other integral-reflector light source may be employed. Due to the known problems of adequately cooling such lamps, the module preferably comprises a heat sink with a well in which the lamp is mounted and immersed in Flouroinert or another transparent and electrically inert heat transmissive fluid. Convection caused by the heat of the bulb, and amplified by the internal arrangement of the well causes circulation of the fluid. The front face of the module is sealed with a dichroic "hot-mirror", which may be provided with a convex or concave shape which, with the difference in refractive index of the fluid and air, produce an integral condensing lens.

A dowser module 111M, including a dowser and actuator is inserted when a discharge lamp is employed.

An aperture module 103M is inserted, having the combination of beam-modifying elements and actuators required. The unit illustrated has an aperture plate displaced along guide rails by a small linear actuator, and mounts an iris and gobo wheel was described in connection with FIG. 1. Other modules with other combinations of beam-modifying elements and actuators are preferably available.

A color-changer module 700M is inserted as required. The unit illustrated employs a known color-scroll system, although several different modules with other types of color-changer are preferably available.

A mirror module 108M is inserted in the highest position of chassis 210B. Modules with planar mirrors; beam-forming non-planar mirrors, and variable-curvature mirrors are preferably available. In the illustrated embodiment, a cylindrical flange has been spun in the module plate. Two circumferal grooves are provided in the flange. A second spun cylinder of slightly different diameter is provided for supporting the mirror, and incorporates two mating grooves. Insertion of ball bearings in the grooves during assembly produces a lightweight and inexpensive rotary bearing 108F permitting the rotation of mirror 605B relative to the chassis by the motor mounted to the module plate.

It will be apparent that the modular organization of the disclosed fixture permits the user to assemble a variety of fixtures having different lighting sources and optical systems, as well as different beam-modifying elements. For example, reflector module 161M could be used with a variable-curvature mirror module to provide a wash light which can be equipped with a color changer by simply inserting color changer module 700M. Adding an aperture plate and substituting a mirror module with a non-planar mirror would provide a hard-edged beam. Substituting a discharge light source and dowser module would increase intensity. Not only can the assortment of fixtures in a given section be quickly and easily changed, but field service is vastly easier. Instead of replacing the entire automated fixture, as is currently the case, the user simply replaces the appropriate module.

Further, this modularity preferably extends to the electronic level, each module also carrying the electronics required by the actuators on that module. Ultimately this may extend to the point that a memory means storing the desired values for those actuators on the module in the various cues is carried on the module. Thus, the user can assemble an unprecedented number of different fixture types from a limited number of modules, and in asserting or removing the module from a chassis, adds or removes the electronics required for its operation. Further, any failure of a given function of a fixture can be repaired by simply replacing the appropriate module. As the mechanical, electro-mechanical, and electronic components for that function are all on the module, it need only be replaced and no determination of which component is responsible for the failure is required as a precondition to service.

In every case in the foregoing, variations within the spirit of the invention will be apparent to those of skill in the art, and should not be understood as limited except by the claims.

What is claimed is:

1. Apparatus for remotely adjusting a beam of light in two axes comprising: a first support; a light source coupled to the first support; means for forming a beam suitable for entertainment lighting, said beam directed along a first axis fixed in relation to said first support; a second support mechanically coupled to said first support so as to permit rotation of at least said second support substantially about said first axis; a first remotely-adjustable means for rotating at least said second support about said first axis; first means for redirecting said beam along a second axis, said first means for redirecting mechanically coupled to said second support such that said first axis extends through said first means for redirecting and said beam is incident upon said first means for redirecting in all angular positions of said second support about said first axis within the range of beam adjustment; a third support mechanically coupled to said second support so as to permit rotation of said third support substantially about said second axis; a second remotely-adjustable means for rotating said third support about said second axis; second means for redirecting said beam along a third axis, said second means for redirecting mechanically coupled to said third support such that said second axis extends through said second means for redirecting in all angular positions of said third support about said second axis within the range of beam adjustment; wherein said second support is rotationally supported about said first axis at a point beyond said incidence of said beam upon said first means for redirecting.

2. Apparatus according to claim 1, wherein a rotational coupling is provided between said first support and said second support at a point prior to said incidence, and such that passage of said beam is permitted.

3. Apparatus according to claim 1, wherein said first remotely-adjustable means drives said second support at said rotational support beyond said incidence.

4. Apparatus for remotely adjusting a beam of light in two axes, said beam suitable for entertainment lighting, said apparatus comprising: an assembly, said assembly mechanically coupled to a first support to permit rotation of said assembly relative to said first support about a first axis extending through said assembly, said light beam maintained substantially coaxial with said first axis; first means for remotely adjusting the angular orientation of at least said assembly about said first axis; first means for redirecting said beam along a second axis, said first means for redirecting mechanically coupled with said assembly such that aid first axis extends through said first means for redirecting and said beam is incident upon said first means for redirecting in all angular orientations of said assembly about said first axis within the range of beam adjustment, said redirection defining a near side of said assembly through which said beam enters said assembly prior to incidence upon said first means for redirecting and substantially coaxial with said first axis, and a far side of said assembly substantially coaxial with said first axis beyond said incidence; second means for again redirecting said once redirected beam along a third axis, said second means for redirecting maintained in alignment with said second axis in all angular orientations of said assembly about said first axis within the range of beam adjustment so as to permit rotation of said second means for redirecting about said second axis; second means for remotely-adjusting the angular orientation of said second means for redirecting about said second axis; said mechanical coupling of said assembly and said first support to permit rotation being provided on both said near side and said far side of said assembly.

5. Apparatus according to claim 1, wherein said first remotely-adjustable means comprises a rotary actuator having a fixed and a rotating portion, one coupled to said first support and the other coupled to said second support, said actuator having an effective rotational centerline coaxial with said first axis.

6. Apparatus according to claim 4, wherein said first remotely-adjustable means comprises a rotary actuator having a fixed and a rotating portion, one coupled to said first support and the other coupled to said second support, said actuator having an effective rotational centerline coaxial with said first axis.

7. Apparatus according to any one of claims 1, 2, 3, or 4, wherein said third support is supported from said second support by an elongated member extending substantially coaxial with said second axis.

8. Apparatus according to claim 7, wherein said second means for redirecting comprises a non-planar reflective surface having a divergent optical effect.

9. Apparatus according to claim 7, wherein said third support is rotationally fixed to said elongated member and said elongated member is rotationally coupled at said second support for actuation by said second remotely-adjustable means, said second remotely-adjustable means comprising an actuator carried on said second support.

10. Apparatus according to claim 9, wherein said second means for redirecting comprises a non-planar reflective surface having a divergent optical effect.

11. Apparatus according to any one of claims 1 or 4, wherein said second means for redirecting is an optical element having a divergent optical effect.

12. Apparatus according to any one of claims 1 or 4, wherein said first support defines an enclosed volume, and wherein said second support and said third support can be oriented such that said second support, said first means for redirecting, said third support, and said second means for redirecting may be substantially enclosed within said volume.

13. Apparatus according to any one of claims 1 or 4, wherein a means suitable for aiming said beam and having a directional character is carried upon said second support so as to be directed with said beam.

14. Apparatus according to claim 13, wherein said means suitable for aiming comprises an imaging device having a field of view substantially conformed to that of said beam.

15. Apparatus according to any one of claims 1 or 4, wherein said first axis and said second axis are substantially perpendicular.

16. Apparatus according to any one of claims 1 or 4, wherein said second axis and said third axis are substantially perpendicular.

17. Apparatus according to any one of claims 1 or 4, wherein said first axis is nominally horizontal.

18. Apparatus according to any one of claims 1 or 4, wherein said first and second means to redirect comprise reflective surfaces.

19. Apparatus according to any one of claims 1 or 4, and further employing additional means to redirect prior to said first means to redirect.

20. In an apparatus for adjusting the direction of a beam of light produced by a light projector, said beam suitable for entertainment lighting, said apparatus including a reflective surface, said beam incident upon and reflected by said surface defining an incident and reflected portion of said beam, the centerline of said beam in said incident portion defining a first axis, and a direction of said beam being altered by rotation of said reflective surface about substantially said first axis by a remotely-adjustable actuator, the improvement wherein said reflective surface is supported by an elongated shaft substantially coaxial with said first axis and interior to said beam, said reflective surface being rotationally fixed to said elongated shaft, and said direction of said beam altered by rotation of said elongated member and said reflective surface by said actuator.

21. Method for remotely-adjusting the direction of a beam of light suitable for entertainment lighting, comprising the steps of:

- redirecting the beam once with first reflective surface;
- supporting the first reflective surface by means of at least two rotational couplings to a fixed support, said rotational couplings spaced apart along and effectively coaxial with the elongated centerline of said beam as incident upon said first reflective surface, so as to permit remotely controlling the rotation of said reflective surface substantially about said elongated centerline so as to alter the direction in which said beam is redirected through a first axis while maintaining incidence of said beam upon said reflective surface;
- redirecting said once-redirected beam a second time with a second reflective surface;
- remotely controlling the rotation of said second reflective surface substantially about the elongated centerline of said beam as redirected by said first reflective surface and incident upon said second reflective surface so as to alter the direction in which said beam is redirected in a second axis, said second axis substantially perpendicular to said first axis, while maintaining incidence of said beam upon said second reflective surface.

* * * * *